(No Model.)
Z. E. BOULE.
ATTACHMENT FOR LAWN MOWERS.
No. 438,340. Patented Oct. 14, 1890.
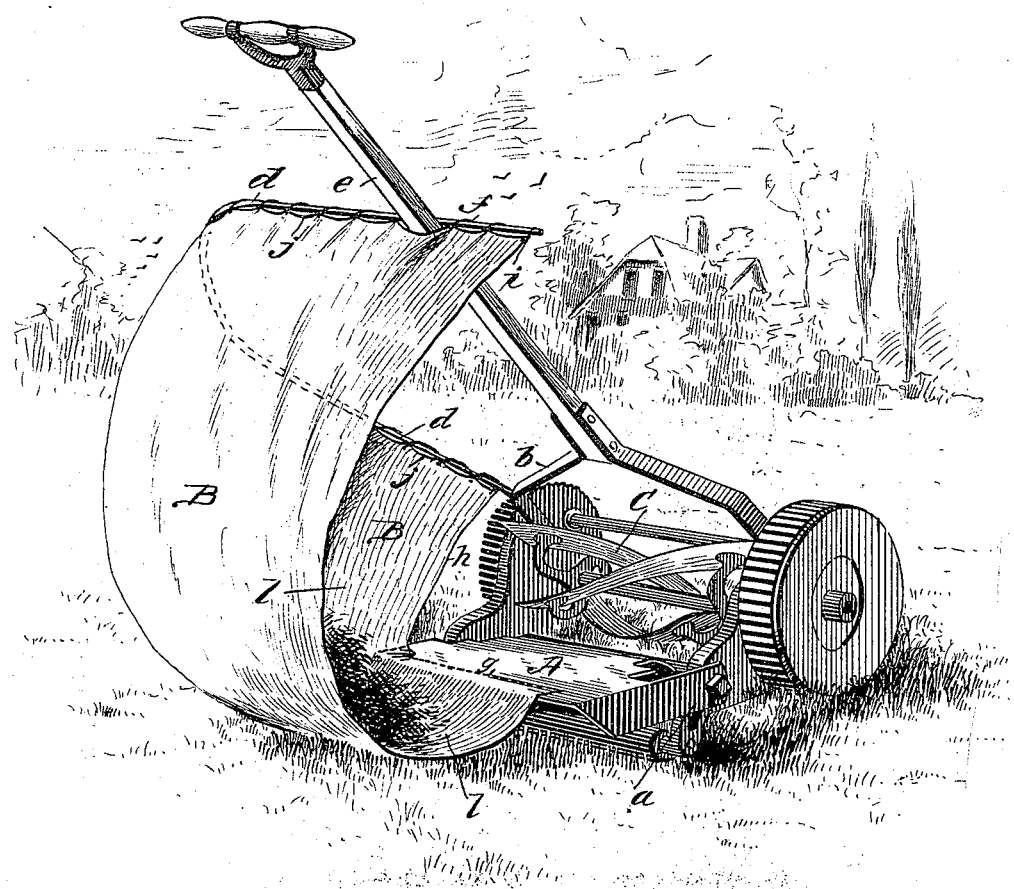
Witnesses:
Inventor,
Z. E. Boule,
by Chapin & Co,
Attys.

United States Patent Office.

ZEPHIR E. BOULE, OF SPRINGFIELD, MASSACHUSETTS.

ATTACHMENT FOR LAWN-MOWERS.

SPECIFICATION forming part of Letters Patent No. 438,340, dated October 14, 1890.

Application filed June 11, 1890. Serial No. 354,993. (No model.)

*To all whom it may concern:*

Be it known that I, ZEPHIR E. BOULE, a citizen of the United States, residing at Springfield, in the county of Hampden and State of Massachusetts, have invented new and useful Improvements in Attachments for Lawn-Mowers, of which the following is a specification.

This invention relates to that class of lawn-mower attachments which are in the form of receptacles capable of attachment at the rear of the wiper or cutter, and into which the grass as it is cut is thrown, the object of the present invention being the provision of a contrivance of the class mentioned which is simple and inexpensive, easy of application to and detachment from the machine, and above all is susceptible of permitting the most ready removal therefrom of the accumulations of cut grass.

The invention consists in the construction or formation of the attachment, all substantially as will hereinafter more fully appear, and be set forth in the claims.

Referring to the drawing, in which the present invention is illustrated, the figure is a perspective view of a lawn-mower of a common type, showing a receptacle attachment constructed in accordance with the present invention applied thereon.

The receptacle attachment consists of a wide bag or pocket which is adapted by its forward bottom portion to be secured to a suitable part or extension of the machine at the rear of the cutter and to extend from one side of the machine to or near to the other side thereof, having also an open top and one open side, and the said receptacle attachment is also adapted to be supported on the handle or draft pole of the machine.

Referring to the drawing, A represents a guard of a general platform shape provided at its ends with lugs $a$, by which it may be bolted or otherwise secured to the cheek-plates of the lawn-mower, and overlying at its forward edge a portion of the usual horizontal and stationary cutter-bar, in connection with which the rotary shear-knives C act, and said guard also extends over and covers the roller at the rear of the cutters.

$d$ represents a stay or supporting rod for the top portion of the receptacle attachment, which stay is of any suitable material, heavy wire being preferably employed, and said stay is by its forward extremity secured to one of the forked members $b$ of the handle $c$, being thence extended rearwardly and then transversely of the machine, crossing by its terminal portion $f$ the said handle $c$, and being supported thereon. Said terminal portion of the stay, as shown, extends across toward the right-hand side some distance beyond the handle. A portion $g$ of the lower and forward edge of the receptacle B is secured to the rear edge of said guard A, and another portion $h$ of said edge, which is laterally outside of the said guard, is upwardly turned, and at the corner $i$ is secured to the said supporting-rod $d$, and the upper edge $j$ of the receptacle is engaged along the length thereof with the said stay-rod, extending rearwardly and then transversely, as shown, the receptacle-pocket at the part formed by the edge $l$ being open.

It is to be understood in the running of the lawn-mower that the cutters throw the grass diagonally across the course of the machine, and therefore the accumulation of grass will be made at and toward the closed side of the pocket and without trouble, the grass, on momentarily stopping the machine, may be pushed out at the open end of the catch-receptacle and without the necessity of removing or opening any lid or inclosing part.

The receptacle attachment, being usually of flexible material and being in substance supported on the swinging handle $c$ of the lawn-mower, may freely accommodate itself to the movements of the handle, and when the handle is swung downwardly sufficiently far the bottom of the receptacle attachment may rest upon the ground.

What I claim as my invention is—

1. An attachment for lawn-mowers, consisting of a cut-grass receptacle or pocket having an open front and one open side and adapted to be supported on the rear of a lawn-mower with its open front toward the cutters and its said open side toward one side of the machine, for the purpose set forth.

2. The combination, with a guard adapted for attachment at the rear of a lawn-mower, of a stay or bent supporting-rod, as $d$, adapted to be connected to the handle, as described, and a receptacle or pocket for the cut grass, adapted to be supported from said stay and having its front and one side open and by its front edge secured to said guard, all substantially as and for the purpose set forth.

3. An improved attachment for lawn-mowers consisting of a receptacle or pocket for cut grass, having an open top, an open front, and an open side, and provided with a stay-rod from which the top edges of the pocket are suspended, and said stay-rod adapted to be supported from the draft-handle of the machine, substantially as and for the purpose set forth.

ZEPHIR E. BOULE.

Witnesses:
WM. S. BELLOWS,
H. A. CHAPIN.